March 12, 1929.  A. STUBER  1,704,811
PROJECTOR
Filed Sept. 30, 1926
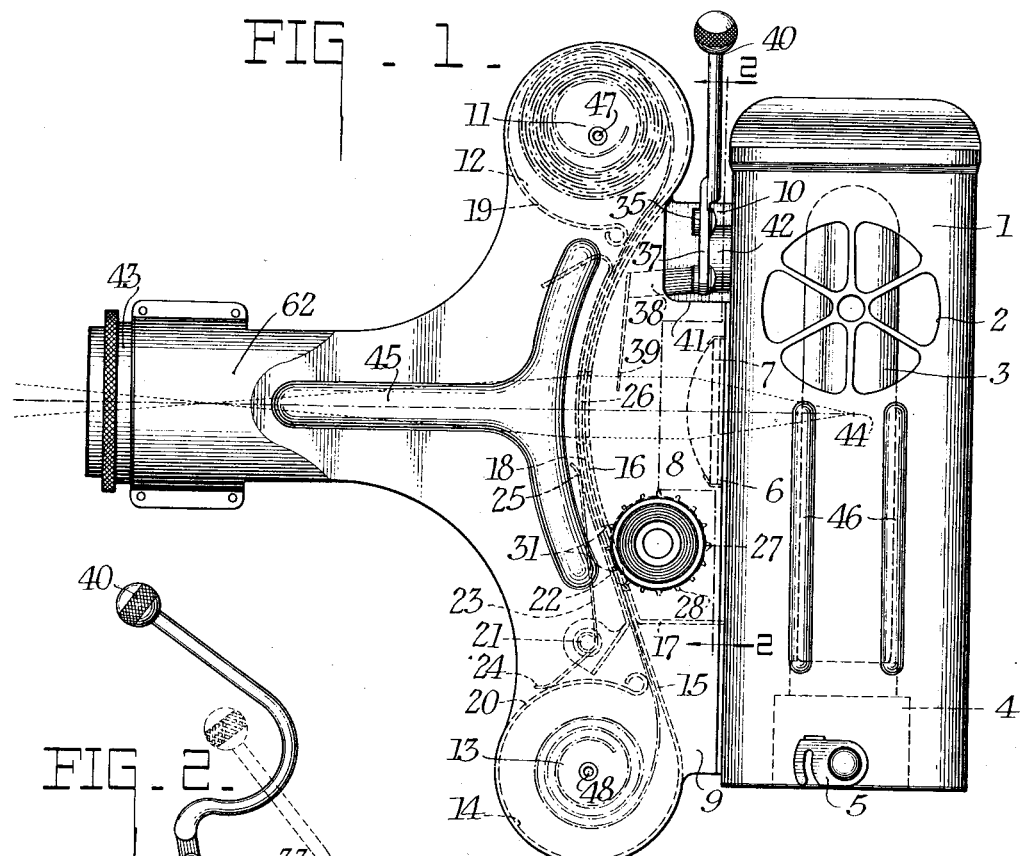
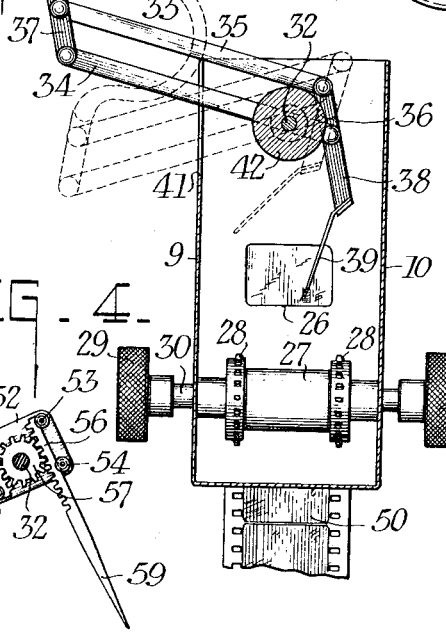
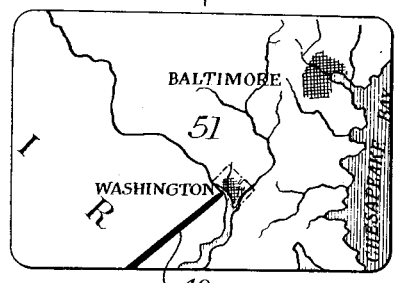
INVENTOR,
Adolph Stuber,
BY
ATTORNEYS.

Patented Mar. 12, 1929.

1,704,811

UNITED STATES PATENT OFFICE.

ADOLPH STUBER, OF ROCHESTER, NEW YORK, ASSIGNOR TO EASTMAN KODAK COMPANY, OF ROCHESTER, NEW YORK, A CORPORATION OF NEW YORK.

PROJECTOR.

Application filed September 30, 1926. Serial No. 138,647.

This invention relates to projectors particularly of the type in which images are thrown upon a screen from a transparency at an illuminated window.

Such projectors are frequently used by teachers and lecturers who both operate the projectors and discuss the projected pictures. It is frequently desirable to point out a particular part of the projected image and this is difficult because the presence of the speaker is required at the projector.

An object of my invention is to provide a mechanism whereby the operator can control a pointer without leaving the projector. This object is obtained by positioning, sufficiently near the exposure window to be projected in reasonably sharp focus, a pointer which can be moved at will across the light beam so that its image will be projected with the picture and can be used to indicate any selected part.

Other objects and advantages will appear in the following description, reference being made to the accompanying drawing, wherein the same characters denote the same parts throughout and in which Fig. 1 is a side elevation of a projector embodying my invention, various concealed elements being shown in broken lines.

Fig. 2 is a section on the line 2—2 of Fig. 1, showing the pointer mechanism, but omitting the film chambers.

Fig. 3 shows a typical image as projected on a screen.

Fig. 4 is a framentary view showing a modified form of control mechanism.

The projector with which I have chosen to illustrate my invention comprises a lamp house 1, with a ventilating opening 2, and containing a lamp 3, carried on a suitable base 4. A catch 5 is shown by which the lamp house can be secured to a suitable supporting base, not shown. In the front wall 6 of the lamp house is supported a condenser 7. The casing 8 extends forwardly from the lamp house and comprises two side walls 9 and 10. Wall 9 extends up to form a wall 11 of film chamber 12 and down to form a side wall 13 of chamber 14. Between walls 9 and 10 is a wall plate 15 having a curved front portion 16 and a flat bottom portion 17. Supported on the front wall 16 is a second curved sheet 18, the ends of which are curved to form the cylindrical walls 19 and 20 of the film chambers 12 and 14.

Pivoted on pin 21 on wall 9, forwardly of the parts 16 and 18, is a member 22 bowed to fit wall 18 and resiliently pressed against it by spring 23 coiled around pin 21 and with its ends 24 and 25 contacting the cylindrical wall 20 and member 22 respectively.

Registering apertures are formed in members 16, 18 and 22, which constitute a gate, to form a window 26 in alignment with condenser 7. A sprocket 27 having teeth 28 is supported between walls 9 and 10 and may be turned by the knurled finger pieces 29 on shaft 30 extending through the walls. The sprocket is used to advance the film 50, the teeth extending through slots 31 in members 16 and 18.

On the front wall 6 of the lamp house 1 is a pin 32 carrying a mechanical system, here shown as a pantograph lever system 33 comprising two long arms 34 and 35, one of which, 34 is pivoted on pin 32 and two short arms 36 and 37 pivoted to the ends of the long arms, the arm 36 having a bent portion 38 carrying a pointer 39 within the casing and the arm 37 carrying a manipulating handle 40 outside the casing. Parts of this system extend out of the casing, the top being open between the walls 9 and 10, and the wall 9 of which has an opening 41. A washer 42 spaces the lever system from the wall 6.

Wall 9 is continued forwardly and is bent at 62 to embrace an objective mount 43, the objective being in alignment with the window 26, condenser 7 and the lamp filament, situated at 44. The wall 9 has a strengthening boss 45 and the lamp house has bosses 46.

The apparatus shown is used principally for the projection of still picture from a piece of film 50, a loose coil of which is placed in the upper chamber 12, over pin 47. The film is threaded between presser 22 and the fixed wall 18 and as the film is advanced it will coil itself loosely about pin 48 in chamber 14. It is to be understood that the film chambers and gate are open toward the rear in Fig. 1.

The described details of the projector as a whole are not a part of my invention and are included merely to illustrate an apparatus in which my invention is embodied.

Certain features of this projector are more fully shown in an application of H. C. Wellman Serial No. 138,648, filed Sep. 30, 1926.

It is obvious that as the end of the handle is moved from the position shown in dotted lines to the full line position (Fig. 1) the end of the pointer will be moved in a reverse direction and that these may be considered as conjugate points of the mechanism, the direction of their movements being always opposite and the extent of movement being dependent on the proportions of the lever arms. As shown the movement of the handle will be greater than that of the pointer. The parts may be loosely pivoted so that the weight of the handle will normally cause it to fall to the dotted line position, raising the pointer out of alignment with the window, but there may be sufficient friction to hold them in adjusted position.

The operator, when he desires to point to a particular part of a view that is being projected, move the handle from its position of rest in an upward direction, thereby moving the pointer across the projection beam in a reverse downward direction. Since the projected image is inverted, the image of the pointer will move across the screen in an upward direction. The operator, therefore, merely moves the handle 40 in the same direction in which he wishes the pointer to appear to move. In Fig. 3 the image of the pointer is shown at 49 as it would appear upon a projected image 51.

It is to be understood that other mechanical systems, such as are well known, having two conjugate parts interconnected for reverse movement, are to be considered the equivalent of the pantograph system shown. A typical alternative form is shown in Fig. 4, in which the mechanical system alone is shown. On the pin 32 is pivoted a casing comprising two plates 52, one of which is not shown, connected by pins 53 on which are rollers 54 bearing against the backs of rack bars 55 and 56, the teeth of which intermesh with opposite sides of pinion 57, also pivoted on pin 32 between the plates. One rack 55 is extended to form a handle 58 and other to form a pointer 59. The use and position of this system is the same as of that previously described.

It is obvious that numerous other embodiments of my invention are possible. I consider as within my invention all such modifications and equivalents as fall within the scope of the appended claims.

Having thus described my invention, what I claim as new and desire to secure by Letters Patent is:

1. In a projector, a frame, a support on the frame with an exposure field and having means for holding an image carrying member at said field, an optical system carried by the frame for projecting images from said field, a pointer movably supported on the frame for free movement in any direction across said field, and a manipulating member connected to the pointer.

2. A projector comprising a frame, a support on the frame with an exposure field and having means for supporting an image bearing element at said field, an optical system carried by the frame for projecting an image from said field, a pointer movably supported by the frame for free movement in any direction over the entire field, a manipulating member and a lever system interconnecting said member and pointer.

3. In a projector, a frame, an exposure gate, an optical system capable of projecting an inverted image of an object at said gate, a mechanical system carried by said frame and having conjugate parts interconnected for simultaneous movement in reverse directions, a pointer connected to one of said parts for free motion in any direction across the gate, and a handle connected to the other of said parts, whereby a movement of the handle in one direction will produce a reversed movement of the pointer across the gate and the inverted image of the pointer will move in the same direction as the handle.

4. In a projector, a frame, a source of light, an exposure gate and a projection objective supported in alignment by said frame, whereby a beam of light from said source is projected through the gate and objective, a mechanical system pivotally mounted on the frame near the gate and having conjugate parts interconnected for simultaneous movement in reverse directions, a pointer carried by one of said parts and capable of free movement in any direction across the beam, and a handle carried by the other of said parts whereby a movement of the handle in one direction will produce a reversed movement of the pointer across the gate and a movement of the image of the pointer in the same direction as the handle.

5. In a projector, a frame including a casing, an exposure gate having a window in said casing, an optical system carried by said frame and capable of projecting a beam of light through said window, a mechanical system mounted on the casing near the window and having conjugate parts interconnected for simultaneous movement in reverse directions, a pointer carried by one of said parts within the casing and capable of free movement in any direction across the beam near the window, and a handle carried by the other of said parts outside the casing whereby a movement of the handle in one direction will cause a movement of the image of the pointer in the same direction.

6. In a projector, a frame, an exposure gate, an optical system capable of projecting an image of an object at said gate, a pantograph lever system pivotally mounted at a point on said frame near the gate and including two elements having movements in opposite directions with respect to said pivotal point, a pointer carried by one of said elements and capable of free movement in any direction over the entire gate, and a manipulating handle carried by the other element whereby movement of the handle in one direction will cause movement of the projected image of the pointer in the same direction.

7. In a projector, a frame including a casing, a source of light within said casing, an optical system carried by the frame, for projecting a beam of light from said source, a support for holding an image bearing transparency in said beam, a pointer within said casing near said support, a manipulating handle outside said casing, a pantograph lever system pivotally mounted on said casing near the support and carrying the pointer and handle on opposite sides of the pivot point, whereby a movement of the handle will cause a reversely directed movement of the pointer across the beam.

Signed at Rochester, New York, this 25 day of September, 1926.

ADOLPH STUBER.